Sept. 17, 1929.    R. S. SANFORD    1,728,255

BRAKE OPERATING CONNECTION

Filed Jan. 8, 1926

INVENTOR
Roy S. Sanford
BY
M. W. McConkey
ATTORNEY

Patented Sept. 17, 1929

1,728,255

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE-OPERATING CONNECTION

Application filed January 8, 1926. Serial No. 79,953.

This invention relates to brakes, and is illustrated as embodied in novel operating mechanism for a brake on a swivelled automobile wheel.

One important object of the invention is to provide operating mechanism which will automatically vary the pressure on the brake when the wheel is swivelled in one direction without substantially affecting the pressure when the wheel is swivelled in the opposite direction, thus making it possible to relieve the pressure on the outer brake on a turn without substantially affecting the pressure on the inner brake.

Another feature of the invention relates to operating the brake by a lever engaging a novel cam surface on a brake-applying crank arm swivelling with the wheel. This cam surface may, if desired, be arranged to relieve the pressure on the outer brake without affecting the inner brake, as explained above.

The above and other objects and features of the invention, including various desirable details of construction, will be apparent from the following description of the illustrative embodiment shown in the accompanying drawings, in which.

Figure 1:
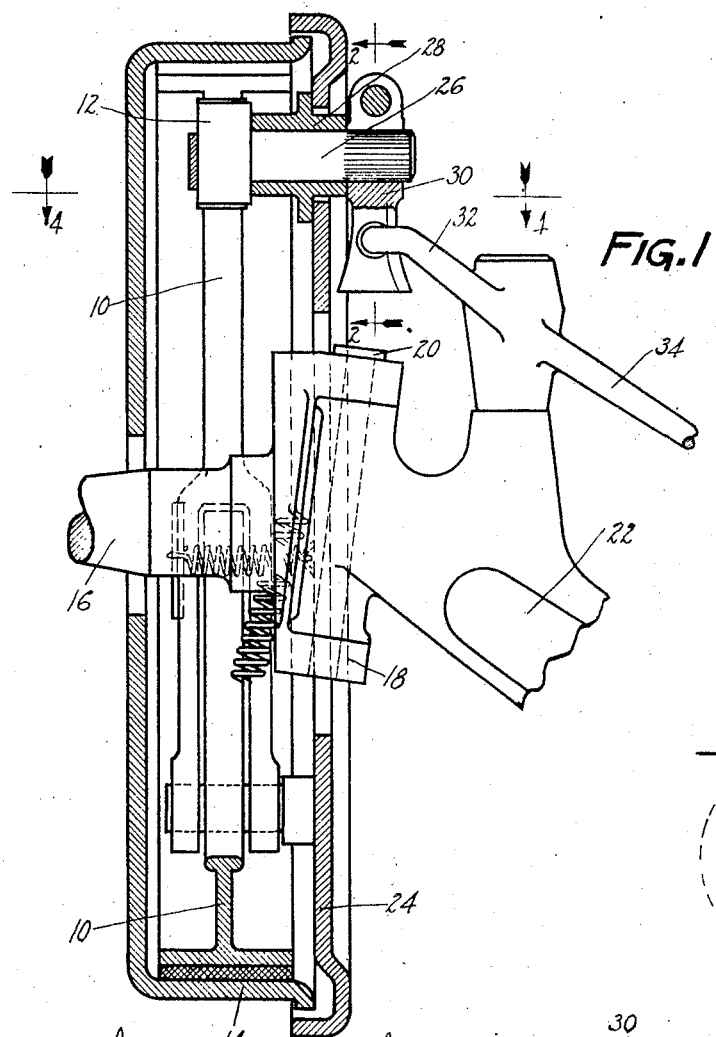
Fig. 1 is a vertical transverse section through the brake and associated parts.

The brake illustrated includes shoes or other friction means 10 operated by a device such as a double cam 12 to be forced against a drum 14. Drum 14 rotates with a wheel (not shown) mounted on the spindle 16 of a knuckle 18 swivelled by a king pin 20 or the like at the end of an axle 22. The open side of drum 14 is shown closed by a backing plate 24 carried by knuckle 18.

Cam 12 or its equivalent may be operated by a shaft 26, shown journalled in a support 28 carried by backing plate 24, and on the end of which is adjustably clamped a novel lever or crank arm 30 engaged by a ball 32 on the end of a lever 34 pivoted, preferably on axle 22, for movement generally horizontally,—i. e. for movement about a generally vertical axis.

Figure 5:
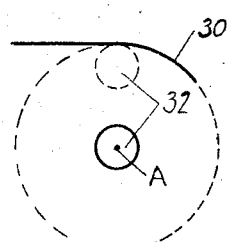
Fig. 5 is a diagram corresponding to Fig. 4, but showing the parts arranged to relieve the pressure on the outer brake on a turn without substantially affecting the inner brake.
Figures 2, 6:
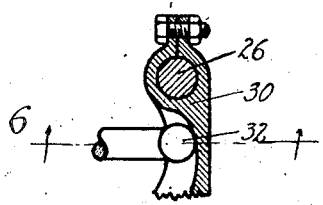
Fig. 2 is a vertical section through part of the brake control on the line 2—2 of Fig. 1.
Fig. 6 is a section on the line 6—6 of Fig. 2.
Figure 4:
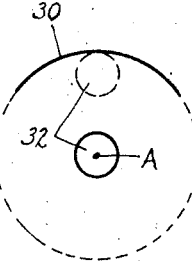
Fig. 4 is a diagram corresponding to a horizontal section on the line 4—4 of Fig. 1.

According to an important feature of the invention, ball 32 is arranged when the brake is not applied with its center substantially in the swivelling axis (i. e. the axis of king pin 20), shown diagrammatically at "A" in Figs. 4 and 5. Lever 30 is formed with a novel cam surface, the part engaging ball 32 at this time, as shown in Fig. 2, being on a substantially semi-circular arc of the same radius as ball 32. Thus when the wheel is swivelled when the brake is not applied, arm 30 merely slides idly around ball 32 without changing its position.

Figures 3, 7:
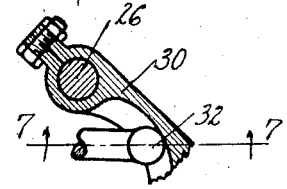
Fig. 3 shows the same parts as Fig. 2, but in different positions.
Fig. 7 is a section on the line 7—7 of Fig. 3.

When the brake is applied, as in Fig. 3, the ball 32 is swung forwardly of the car to the dotted line position in Figs. 4 and 5. If the outer brake is not to be relieved on a turn (Fig. 4) the part of the cam surface of lever 30 at this time engaged by ball 32 is on an arc curving in a circle about a center in the swivelling axis "A". Thus here again swivelling the wheel merely causes arm 30 to slide idly over ball 32 without changing its position. Similarly the horizontal sections through the arm 30 in its various angular positions are all on arcs of circles having their centers in the axis "A", the radius of each circle being the distance from that axis to the point of tangency of arm 30 with ball 32 when in the corresponding angular position.

If the outer brake is to be relieved, however, I prefer the arrangement illustrated in Fig. 5. In this arrangement, the side of the arm 30 opposite the wheel is curved on the circular arc as before, so that swivelling the wheel to place it on the inner side of the turn does not affect the position of arm 30 and therefore does not vary the pressure on the brake. As the diagram is for the left front wheel, with the front of the car at the top, the circularly-curved section of the cam surface is at the right of the point of engagement with ball 32 when the car is moving straight ahead.

The other side of the cam surface (the left side in Fig. 5), however, diverges sharply from the above-described arc, and is preferably (in horizontal section) on a straight line tangent to the arc. Thus swivelling the wheel to place it on the outer side of the turn (to the right in Fig. 5), causes the ball-engaging surface of arm 30 to recede from ball 32, thus permitting arm 30 to swing slightly rearwardly to relieve the pressure on the brake. When this action is desired, the two front brakes should not be equalized.

While one particular mechanical arrangement has been described in detail, it is not my intention to limit the scope of the invention to that particular arrangement, or otherwise than by the terms of the appended claims.

I claim:

1. A swivelled wheel having a brake and operating connections for the brake comprising inter-engaging parts, one swivelling with the wheel and one not swivelling with the wheel and having interengaging parts adjacent and so constructed and so arranged with respect to the swivelling axis of the wheel moving with respect to each other about that axis so that there is no substantial variation in the pressure on the brake when the wheel is swivelled to place it on the inside of a turn, but having one part formed with a wedge surface, such that there is a distinct variation in the pressure on the brake when the wheel is swivelled to place it on the outside of a turn.

2. A swivelled wheel having a brake and operating connections for the brake comprising inter-engaging parts, one swivelling with the wheel and one not swivelling with the wheel and having interengaging parts adjacent and so constructed and so arranged with respect to the swivelling axis of the wheel moving with respect to each other about that axis so that there is no substantial variation in the pressure on the brake when the wheel is swivelled in one direction but having one part formed with a wedge surface, such that there is a distinct variation in the pressure on the brake when the wheel is swivelled in the opposite direction.

3. A swivelled wheel having a brake and operating connections for the brake comprising inter-engaging parts, one swivelling with the wheel and one not swivelling with the wheel and having interengaging parts adjacent and so constructed and so arranged with respect to the swivelling axis of the wheel moving with respect to each other about that axis so that there is no substantial variation in the pressure on the brake when the wheel is swivelled to place it on the inside of a turn but having one part formed with a wedge surface, such that there is a distinct reduction in the pressure on the brake when the wheel is swivelled to place it on the outside of a turn.

4. A swivelled wheel having a brake and operating connections for the brake comprising, in combination, a part swivelling with the wheel, and a cooperating part not swivelling with the wheel, the first part turning around the second part substantially without movement when the wheel is swivelled in one direction, and one of the parts having its engaging surface at one side varied from the arc of a circle having its center in the swivelling axis, so that the second part permits the first part to move to vary the pressure on the brake when the wheel is swivelled in the opposite direction.

5. A swivelled wheel having a brake and operating connections for the brake comprising, in combination, a part swivelling with the wheel, and a cooperating part not swivelling with the wheel, the first part turning around the second part substantially without movement when the wheel is swivelled in one direction, and one of the parts having its engaging surface at one side varied from the arc of a circle having its center in the swivelling axis, so that the second part permits the first part to move to vary the pressure on the brake when the wheel is swivelled in the opposite direction, said parts being so arranged that their interengaging portions move in a direction crosswise of the swivelling axis in applying the brake.

6. A swivelled wheel having a brake and operating connections for the brake comprising, in combination, a generally vertical arm swivelling with the wheel, and an operating member having a curved surface engaging said arm, the arm having a surface of varying curvature engaging the curved surface of the operating member, the curvature of the arm surface in different planes perpendicular to the swivelling axis of the wheel being substantially along arcs of different circles having their centers substantially in the swivelling axis of the wheel.

7. A swivelled wheel having a brake and operating connections for the brake comprising, in combination, a generally vertical arm swivelling with the wheel, and an operating member having a curved surface engaging said arm, the arm having a surface of varying curvature engaging the curved surface of the operating member, the curvature of the arm surface in different planes perpendicular to the swivelling axis of the wheel being substantially along arcs of different circles, the center of each arc being in the swivelling axis of the wheel when the point of engagement between the arm and operating member is in the plane of that arc.

8. Operating mechanism for a brake on a swivelled wheel comprising, in combination, an arm swivelling with the wheel, and a lever movable about a generally vertical axis and which does not swivel with the wheel, the lever having a ball end engaging said arm and arranged with its center in the swivelling axis when the brake is in released position, and the arm having a lever-engaging surface curving in arcs whose centers are in the swivelling axis when they are progressively engaged by said ball end.

9. Operating mechanism for a brake on a swivelled wheel comprising, in combination, an arm swivelling with the wheel, and a lever movable about a generally vertical axis and which does not swivel with the wheel, the lever having a ball end engaging said arm and arranged with its center in the swivelling axis when the brake is in released position, and the arm having a lever-engaging surface curved about the swiveling axis and with its center substantially in that axis when the brake is applied.

10. Operating mechanism for a brake on a swivelled wheel comprising, in combination, swivelling and non-swivelling parts engaging each other and universally movable at their interengaging portions, said portions being arranged at the swivelling axis of the wheel when the brake is not applied and being moved to a material distance from that axis in applying the brake, and said portions being so constructed and so arranged that when swivelling the wheel with the brake applied, at least in one direction, the swivelling part swings about the non-swivelling part substantially without brake-applying or brake-releasing movement, so that swivelling the wheel does not substantially affect the pressure on the brake or the position of the non-swivelling part.

11. Operating mechanism for a brake on a swivelled wheel comprising, in combination, a brake-applying arm swivelling with the wheel, and a lever engaging the arm and movable in applying the brake about a generally vertical axis, the arm-engaging part of the lever being substantially in the swivelling axis of the wheel when the brake is released and the lever-engaging part of the arm being curved about a center in that axis when the brake is applied.

In testimony whereof, I have hereunto signed my name.

ROY S. SANFORD.